United States Patent [19]

Mellqvist

[11] 4,152,260

[45] May 1, 1979

[54] FILTRATION PROCESS

[75] Inventor: Carl-Olof Mellqvist, Höör, Sweden

[73] Assignee: Ellco Protein AB, Sweden

[21] Appl. No.: 875,572

[22] Filed: Feb. 6, 1978

[30] Foreign Application Priority Data

Feb. 15, 1977 [SE] Sweden .............................. 7701661

[51] Int. Cl.$^2$ .............................................. C02B 1/26
[52] U.S. Cl. ............................ 210/65; 210/DIG. 23; 260/112 B; 260/115
[58] Field of Search ......................... 210/65, DIG. 23; 424/101; 260/115, 112 B

[56] References Cited

U.S. PATENT DOCUMENTS

| | | | |
|---|---|---|---|
| 2,955,074 | 10/1960 | Hink, Jr. ............................. | 260/115 |
| 3,083,194 | 3/1963 | Thies et al. ....................... | 260/112 B |
| 3,318,771 | 5/1967 | Jensen ................................ | 424/101 |
| 3,672,954 | 6/1972 | Grippa ............................. | 260/112 B |

*Primary Examiner*—Benôit Castel
*Attorney, Agent, or Firm*—Gordon W. Hueschen

[57] ABSTRACT

A process for the removal of iron compounds from an aqueous blood hydrolysate by filtration, comprising performing the filtration at a rate of less than about 200 liters/m$^2$ filter area, hour, and recovering the filtrate.

5 Claims, No Drawings

FILTRATION PROCESS

The present invention relates to a filtration process and, more specifically, the invention relates to the problem of removing iron-containing material from hydrolysates originating from the hydrolysis of animal blood.

When preparing seasoning compositions starting from hydrolysates resulting from hydrolyses of animal blood, it is desirable to remove the contents of the hydrolysate of free iron and iron-containing materials (in the following simply called "iron") to the greatest possible extent. There are several reasons for this. The presence of "iron" in lipid-containing products constitutes a severe risk that the product will turn rancid, which results in impaired storage stability. Moreover, iron-containing materials often lead to discolouration thus delimiting the area of application. The iron compounds formed in the hydrolysis of blood are not absorbed in the stomach in any significant extent, thus having no nutritional value. Iron may also cause diarrhoea or constipation, thus disturbing the metabolism of the body.

Accordingly, the main object of the invention is to provide a process enabling efficient removal of iron and iron compounds from aqueous blood hydrolysates. Another object of the invention is to provide a process enabling the preparation of storage-stable blood hydrolysates containing iron at a very low level of concentration.

It has been found in connection with developing the technique of filtering aqueous blood hydrolysates that a highly efficient iron removal will take place if the filtration is performed at a rate of less than about 200 $l/m^2$ filter area per hour. Although the invention is not to be bound by any particular theory it is believed that the iron-containing material of the blood hydrolysate will act as a filter aid resulting in efficient removal of the iron in the filtrate. If, however, the filtration rate is increased too much it seems that the gel-like material containing the iron or the iron compounds will fall apart thereby causing the iron compounds to be released into the solution thus passing through the filter. It seems that the iron compounds having a molecular weight up to about 800 are contained or enclosed in gel-like agglomerates mainly consisting of so-called phospholipids. These agglomerates will collect on the filter material if the filtration is performed at a certain maximum rate, whereby an efficient removal of the iron will be obtained.

The filtration is preferably performed at a pH lower than about 8. Acid pHs are preferred in order that undesired bacterial growth shall be avoided. However, too low pHs are unsuited for the purpose in view of resulting denaturation. Thus, a particularly preferred range is about 2 to about 5 with regard to the pH. A suitable range with regard to filtration rate is about 50 to about 100 $l/m^2$, hour.

The inventive technique is applicable to filtering hydrolysates of whole blood as well as hydrolysates of red cell concentrates.

Blood cell concentrates contain about 2.5 g iron and whole blood contains about 2.0 g iron per kg dry solids. During hydrolysis iron compounds are released which in a photometer give a very high absorption of light at a wavelength of 500 nm. This absorption of the iron compounds was used in the experiments resulting in the finding that the filtration rate had a decisive influence on the iron removal from the filtrate. Further experiments were carried out with hydrolysates adjusted to different pHs with sodium hydroxide. In these experiments it was found that at pHs around neutral, which are preferred from the point of view of low corrosion, the filtration rate was quite critical with regard to the iron-removal from the filtrate. Thus, when using a filtration rate exceeding about 200 $l/m^2$ per hour the iron compounds were not retained and passed through the filter medium, whereas at a lower filtration rate the aggregates could resist the filtration forces to separate the iron-containing material from the filtrate. At a filtration rate less than about 100 $l/m^2$ an hour a product containing less than 0.1 g iron per kg dry solid product can be obtained.

The technique of this invention is particularly suitable in connection with the preparation of seasoning compositions comprising the hydrolysate of blood or blood concentrates. Hydrolysis of the blood red cells can be performed using acids or enzymes, hydrochloric acid being preferred.

The starting material, i.e. animal blood, may originate from any animals, such as bovine and hog, but the invention is in no way delimited to the use of such types of blood.

The invention will now be further described by non-limiting examples, wherein all percentages refer to the weight.

EXAMPLE 1

3000 g whole blood of hog and 1000 g hydrochloric acid, density 1.18, are transferred to an autoclave provided with a stirrer. The contents of the autoclave are held at 125° C. and 1.2 atms overpressure for about 10 hours under stirring.

The autoclave is opened after cooling and the hydrolysate is removed therefrom, cooled down to room temperature and then neutralized with sodium hydroxide to a pH of about 3.5. The neutralized hydrolysate is then subjected to centrifugation at about 3000 g to separate most of insoluble materials. After centrifugation the aqueous hydrolysate is filtered using a plain circular filter paper, (POSTLIP, plain paper, grade STO, England). A filtering rate of about 75 $l/m^2$ an hour is maintained, the filtering pressure varying from about 0.5 to about 2.2 atms overpressure for a filtering period of about 5 hours. An almost clear solution is obtained which is treated with activated carbon which is removed by sedimentation. The resulting solution is spray dried using hot air and about 700 g of a light powder is obtained having the approximate composition:

| Amino acids, oligo- and polypeptides | 60 % |
|---|---|
| Salts (mostly NaCl) | 35 % |
| Water | 5 % |
| Iron | 0.01 % |

The powder obtained is storage stable for long periods of time and so is the bouillon obtained by dissolving the powder in water.

EXAMPLE 2

The procedure of Example 1 above is repeated but using instead of whole blood 3000 g red cell concentrate having a dry solids content of about 35% and originating from a mixture of bovine and hog blood. The filtration is carried out using a plain paper, De Vita No. 280, Fratinelli De Vita, Italy. 1200 g of a light powder is obtained having the approximate composition:

| | |
|---|---|
| Amino acids, oligo- and polypeptides | 65 % |
| Salts (mostly NaCl) | 30 % |
| Water | 5 % |
| Iron | 0.01 % |

EXAMPLE 3

Starting from hog blood, 3000 g red cell concentrate having a dry solids content of about 35% is prepared. The red cell concentrate is transferred to an autoclave together with 350 g concentrated sulphuric acid and 750 g water. The contents of the autoclave are held at about 120° C. and 1.15 atms overpressure for a period of time of about 8 hours under stirring.

After cooling the hydrolysate is removed from the autoclave and is neutralized with milk of lime to a pH of about 7. Filtration of the neutralized hydrolysate is carried out using a drum filter under vacuum, the drum filter being precoated with kieselguhr. The filtration was performed at a rate of about 60 l/m$^2$ an hour under continuous removal of the deposited filter cake consisting of gel-material, gypsum and kieselguhr using a scraping knife.

After spray drying in the same manner as described in Example 1 900 g of a light powder is obtained having the same characteristics as that of Example 1 but not the same saltiness in view of the use of sulphuric acid for the hydrolysis.

It is seen from the instant disclosure that the invention provides for a highly useful and efficient filtering technique enabling removal of iron from blood hydrolysates. Seasoning products, for example, prepared from such filtered iron hydrolysates are highly advantageous as regards taste and stability and also appearance.

It is to be understood that the invention is not to be limited to the exact details of operation or procedures shown and described, as obvious modifications and equivalents will be apparent to one skilled in the art, and the invention is therefore to be limited only by the scope of the appended claims, including the application of the doctrine of equivalents thereto.

What is claimed is:

1. A process for the removal of iron compounds from an aqueous blood hydrolysate by filtration, said hydrolysate containing iron compounds which in a photometer give a high absorption of light at a wavelength of 500 nm, comprising performing the filtration on a hydrolysate selected from the group consisting of a hydrolysate of an aqueous red cell concentrate and a hydrolysate of whole blood at a pH lower than about 8, and at a rate of less than about 200 liters/m$^2$ filter area per hour, and recovering the filtrate.

2. A process according to claim 1, wherein the filtration is performed at an acid pH.

3. A process according to claim 2, wherein the filtration is performed at a pH of about 2 to about 5, and at a rate within the range of about 50 to about 100 l/m$^2$ per hour.

4. A process according to any of claims 1-3, wherein the hydrolysate is a hydrolysate of an aqueous red cell concentrate.

5. A process according to any of claims 1-3, wherein the hydrolysate is a hydrolysate of whole blood.